United States Patent

McCaffrey

[15] 3,645,834
[45] Feb. 29, 1972

[54] REINFORCED FLUOROCARBON POLYAMIDE CONTAINERS

[72] Inventor: Lee A. McCaffrey, Cuyahoga Falls, Ohio
[73] Assignee: The Goodyear Tire & Rubber Company, Akron, Ohio
[22] Filed: Mar. 24, 1969
[21] Appl. No.: 809,997

[52] U.S. Cl. ..................................161/92, 117/68, 117/76, 117/161, 156/259, 161/189, 161/219, 161/227, 138/174
[51] Int. Cl. ..................................B32b 15/08, B32b 27/12
[58] Field of Search.................161/189, 216, 219, 227, 92; 117/76 F, 68, 161 UH; 260/805; 156/259; 138/174

[56] References Cited

UNITED STATES PATENTS

| 3,511,212 | 5/1970 | Burns | 161/189 X |
|---|---|---|---|
| 3,408,453 | 10/1968 | Shelton | 161/189 X |
| 3,136,680 | 6/1964 | Hochberg | 161/187 |
| 2,968,649 | 1/1961 | Pailthorp et al. | 260/80.5 |
| 2,932,597 | 4/1960 | St. John et al. | 156/195 X |
| 2,930,106 | 3/1960 | Wrotnowski et al. | 117/161 |

Primary Examiner—Robert F. Burnett
Assistant Examiner—Mark A. Litman
Attorney—F. W. Brunner and J. D. Wolfe

[57] ABSTRACT

This invention relates to the method of making a container, said container comprising forming a laminate comprising a polyamide fabric having a coating of a fluorocarbon composition thereon and a film of either a polyimide or a fluorocarbon adhered to the fluorocarbon composition coating, said film containing a metallic deposit of a reflective nature on its outer surface.

5 Claims, No Drawings

REINFORCED FLUOROCARBON POLYAMIDE CONTAINERS

This invention relates to an improved laminate having reduced heat buildup and to fuel containers made from said laminates.

With the advent of supersonic aircraft, outer space vehicles, and related apparatus, there has been considerable urgency for the development of rubberized materials which would withstand the heat to which such supersonic apparatus would be subjected. More specifically, one of the problems has been that fuel tanks tend to build up sufficient heat to cause the temperature of the fuels stored within the fuel tank to approach its flashpoint and therefore increase the hazards associated with handling fuel under such conditions.

Therefore, it is an object of this invention to provide a laminate which is essentially flexible but yet protects the material stored in contact therewith from building up appreciable temperature during exposure of the laminate to relatively high temperatures. A more specific object of this invention is to provide fuel cells which have sufficient flexibility to withstand relatively high and low temperatures and yet prevent fuels stored within the container from building up to a temperature approaching a temperature to which the outside of the fuel cell is subjected.

The object of this invention can be achieved by forming a laminate by coating a compounded fluorocarbon on a suitable high-temperature polyamide-type fabric and adhering on the outside of the coated fabric a film selected from the class consisting of the fluorocarbons or the polyimide, said film having coated thereon a metallicized film of suitable metals such as aluminum, gold or the other well-known reflective metals. This laminate can be cut, shaped, and cemented together on a suitable building form to form a fuel cell in accord with the conventional fuel cell building technique to give a fuel cell which has a metal reflective film on the outside thereof and thus reduces the heat buildup of the fuel within the container and which has also improved resistance to the loss of fuel by diffusion.

The fluorocarbons useful in this invention are the highly halogenated chain polymers whose structure is composed substantially exclusively of carbon, hydrogen and halogen atoms and are reacted at elevated temperatures with an organic peroxy compound which is stable against decomposition below about 50° C., and with a basic metal compound, to produce a cross-linked polymer. It is preferred that the chain polymers be at least half fluorinated and that —$CH_2$— groups be present. In other words, at least some of the carbon atoms on the chain should be bonded only to hydrogen atoms and other carbon atoms.

Chain polymers with a minor degree of disorder in their molecules are generally more thermoplastic in nature than those without such disorder. Elasticity requires a greater degree of disorder. In order to obtain an elastomeric product, at least 10 percent of the carbon atoms in the structure must be of the type which are bonded only to hydrogen atoms and other carbon atoms. Ordinarily, a mono-olefinic compound containing a $CH_2 =$ group is used to provide these carbon atoms, and this results in chains containing —$CH_2$— groups. Ordinarily, such a mono-olefinic compound is copolymerized with another highly fluorinated mono-olefin to help give the polymer molecule its highly fluorinated nature.

Among the highly fluorinated mono-olefins which may be used as comonomers are: $CF_2=CHCl$, $CF_2=CCl_2$, $CF_3—CF=CF_2$, $CF_2 = CHCl$, $CF_3—CCl = CCl—CF_3$, $CF_3 = CHF$, $CF_3—CH = CH—CF_3$ (cis or trans), $CF_2 = CF_2$,

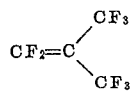

$CF_2 = CFBr$, $CF_2 = CCl—CF_3$, $CF_3—CH = CH_2$ and $CF_3—CCl = CCl_2$.

Among the hydrogen-containing mono-olefins which may be used as comonomers with the above highly fluorinated mono-olefins are: $CF_2 = CH_2$, $CFR = CH_2$, $CH_2 = CH_2$, $CFCl = CH_2$, $CCl_2 = CH_2$, $CClH = CH_2$, $CHBr = CH_2$ and

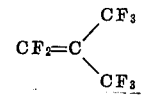

Of these, the most advantageous combinations are: $CF_2 = CFCl/CF_2 = CH_2$, $CF_2 = CF_2/CF_2 = CH_2$, $CF_2 = CF_2/CH_2 = CFCl$, and $CF_2 = CFBr/CF_2 = CH_2$.

The aforementioned mono-olefins may be copolymerized in any proportions, depending on the characteristics desired. Good chemical stability requires fluorine substitution at at least one-half of the possible positions for such substitution in the polymer chain.

It is to be noted that all of the monomers enumerated above contain only carbon, hydrogen and halogen atoms and, therefore, produce copolymers substantially without markedly reactive functional groups. This, of course, does not preclude the presence of other atoms in end groups which might be formed by chain stoppers in the polymerization zone, present by design or by accident. Such end groups are relatively few in number and are difficult to detect. They do not, in any way, affect the characteristics of the polymer to any noticeable degree.

The films useful as barriers in this invention are of the polymeric fluorocarbons and the polyimides. The polymeric fluorocarbon films are made by solution casting or other well-known techniques from the fluorocarbons described hereinbefore, for example, those available commercially under the trade names Kel F, Viton A and B.

Likewise, the films of the polyimide type are made by casting or other well-known techniques from the polyimide or its precursors.

These aromatic polyimides are described in Modern Plastics Encyclopedia (1968-9) and are generally indicated by the formula

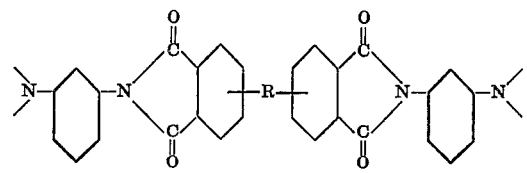

where R is alkylene, arylene or substitute arylene, preferably of two to 10 carbon atoms and usually of about 50,000 molecular weight, though 100,000 and higher can be used, too.

These polyimides are sometimes considered to be a reaction product of an aromatic tetracarboxylic acid anhydride and an aromatic diamine. A specific polyimide representative of the class is the one prepared by reaction of benzophenone tetracarboxylic acid dianhydride and metaphenylene diamine. This reaction product is essentially high molecular weight linear polymers with a limited degree of cross-linking and a high glass transition temperature ($T_g$).

Specific examples illustrative of this invention are disclosed as follows with all parts and percentages being by weight unless otherwise indicated.

EXAMPLES I

A fluorocarbon elastomer, Viton B, 100 parts, was compounded according to the recipe of Table 1 as follows:

TABLE 1

Compounding Recipe

| Ingredients | Parts |
| --- | --- |
| Viton B* | 100 |
| Magnesium Oxide | 15 |
| N,N'-dicinnamylidene-1,6-hexane diamine | 3.0 |
| Red iron oxide | 7.0 |

*A commercial elastomeric terpolymer of vinylidene fluoride, hexafluoropropylene and tetrafluoroethylene.

The compounded fluorocarbon elastomer was dissolved in sufficient methyl ethyl ketone (MEK) to give a cement of 33 percent solids. This cement was used in a cement spreader to coat a square woven polyamide fabric where the polyamide was the copolymer of metaphenylene diamine and isophthaloyl chloride. The fabric prior to being fed to the cement spreader was held for 1 hour at 300° F. to eliminate moisture and oils from the weaving and handling process. The coating on the fabric was built up about 3 mils per pass through the spreader and was dried 15 minutes in an air circulation chamber to remove the ketone. While the cement coating was still tacky an aluminum metallized polyimide film having a thickness of 0.25 to 5, and preferably 1 to 4, mils was spread over the outside of the fabric containing the fluorocarbon coating and cured 60 minutes at 300° F. in a vacuum blanket with 85 p.s.i. backup air pressure to laminate the metallized film to the coated fabric. The cured fabric was cut into pattern strips and the fuel cell or bag assembled on the building table by cementing the seams of the strips together with the MEK cement used to coat the fabric. Kraft paper was used to separate and keep the fabric sheets forming the top and the bottom of the bag from adhering together while spread on the building table. The finished bag was cured using one of the following curing techniques: an autoclave, a vacuum bag, or a hot air oven. Improved performance was obtained with the cells cured with a vacuum bag or a hot air oven.

Also, the cells made with a fuel barrier of about 1 to 16, and preferably 3 to 6, mils of a metallized reflective aluminum polyimide film on the outside of the cell were superior to those where the barrier was on the inside of the cell or inner layer of a laminate. Also, a 1.5 to 3 mil thick metallized barrier film was found to be better than a 0.25 mil one, as it was more resistant to tear.

Thus, the above technique of cell construction provides a fuel cell that withstands flexing at −50° F. and 450° F. and offers resistance to diffusion of the fuel at fuel temperatures of 165° F. The films of the polyimide elastomers described above are particularly desirable as they permit the coating on the polyamide fiber to be thinner and thereby improve the flex life of the resulting laminate as well as enhancing the fuel diffusion resistance at elevated fuel temperatures.

In addition to the fluorocarbon elastomers and polyimide or fluorocarbon elastomer films described in the examples, the copolymers of the advantageous monomer combinations set forth heretofore are particularly desired for use in this invention to form elastomers to be cured with red iron oxide, an alkaline metal oxide and curatives which cure at a temperature of at least 150° F. or higher by activation of the curative.

EXAMPLE II

A woven polyamide fabric, 3.5 ounces per square yard of a copolymer of metaphenylene diamine and isophthaloyl chloride was spread coated on each side with a methyl ethyl ketone solution of a fluorocarbon cement to give a coat of 0.016 inches thick. Then this coated polyamide fabric was cut into strips and formed into a rectangular container by cementing a number of strips together with the MEK fluorocarbon cement. Then a 0.001-inch aluminum metallized polyimide film (Kapton) was applied over the surface of the rectangular container and cemented thereto with the MEK fluorocarbon cement and then cured in an autoclave at 85 p.s.i. and 150° to 160° C. for 60 minutes. Another container was prepared in the same manner except the polyimide film cemented to the outside surface of the container did not contain the aluminum metallized coating thereon. It should be realized that the aluminum or other reflective metal is volatilized in a high-vacuum chamber and deposited in a uniform reflective coat on the film of polyimide or fluorocarbon.

The two containers were then suspended 3 inches from a General Electric infrared heater and the surface temperature of the containers determined at various time intervals until the surface temperature had reached equilibrium. The results of these tests are shown in Table 2

TABLE 2

Container Construction

| No Aluminized Coating | | Aluminized Coating | |
| --- | --- | --- | --- |
| Time in Minutes | Temperature ° F. | Time in Minutes | Temperature ° F. |
| 0 | 77 | 0 | 77 |
| 1 | 350 | 1 | 205 |
| 3 | 407 | | |
| 5 | 420 | 5 | 260 |
| 10 | 420 | 14 | 256 |
| 18 | 420 | | |
| | | 25 | 262 |
| | | 34 | 262 |

The data of Table 2 demonstrates the superior resistance of the aluminized metallic coated fuel container to heat build up from radiant energy such as are experienced by fuel cells in use on the faster air vehicles.

Instead of the aluminum metallized film of polyimide other reflective metallized coated films of other metals can be used instead of the metallized aluminum polyimide film. For instance, a fluorocarbon film having a reflective coating of a metal such as aluminum, gold, silver, copper, etc., can be used to replace the aluminum metallized film of polyimide in Example II.

Although for convenience of comparison the Schiff base N,N'-dicinnamylidene-1,6-hexanediamine was used in the working examples other Schiff bases such as benzylaniline, the ketone reaction products of the aliphatic and aromatic diamines of about one to 20 carbon atoms, for instance, acetone, methyl ethyl ketone and hexylene diamine or phenylene diamine can be used, except care must be exercised to keep the elastomer relatively cool during the compounding to prevent premature curing or scorching. Likewise, the solid amines present this problem so it is preferred to use the lower molecular weight liquid amines as curatives. For example, the liquid tetraethylene pentamines, the diethylene triamine, and ethylene diamine are the preferred amine curatives as they are readily mixed with solvent solutions or cements of the fluorocarbon elastomers without premature curing.

Suitable solvents for the curatives and the elastomers in the preparation of adhesives or cements are the liquid ketones such as acetone, methyl ethyl ketone, methyl isobutyl ketone, tetrahydrofuran, dimethylformamide and lower esters such as ethyl acetate.

EXAMPLE III

To compare the effect of various curing agents a commercial fluorocarbon elastomer, Viton B, was compounded according to the recipe shown in Table 3 and the sheets were cured for 60 minutes at 300° F. Tensile specimens were cut from the cured sheets and tensile and elongation at the break point were determined on these samples at −70°, 77°, and 450° F. and the results of these tests are recorded in Table 4.

TABLE 3

Elastomer Compounded With Peroxide

| Recipe Nos. | 91 | 93 | 106 | 107 |
|---|---|---|---|---|
| Viton B | 100 | 100 | 100 | 100 |
| Magnesium oxide* | 15 | 15 | 15 | 15 |
| Red Iron Oxide | 7 | 7 | 7 | 7 |
| N,N'-dicinnamylidene-1,6-hexane-diamine | 2 | | | |
| Benzoyl Peroxide | | | 4.2 | 3 |
| 2,4-dichlorobenzoyl peroxide | | 1.30 | | |
| Dicumyl peroxide | | | 4 | |

*This magnesium oxide has a surface area of about 23 square millimeters per grams.

TABLE 4

Original Physical Properties of Cured Viton B Compounds

| Recipe No. | Tensile, p.s.i. | | | Elongation and Hardness | | |
|---|---|---|---|---|---|---|
| | −70° | 77° | 450° | −70° | 77° | 450° |
| 91 | 8739 | 2889 | 242 | 36–83D | 925–60A | 195 |
| 93 | 6358 | 2425 | 231 | 25–84D | 711–58A | 185 |
| 106 | 5766 | 2562 | 189 | 26–88D | 794–57A | 147 |
| 107 | 5454 | 2144 | 167 | 31–87D | 768–56A | 151 |

The elongation of the organic peroxide samples are inferior to those obtained with N,N'-dicinnamylidene-1,6-hexanediamine curative.

The organic peroxides useful in this invention generally are hereinafter called polytertiary peroxide or peroxy compounds. The ditertiary peroxides can be represented by the general formula:

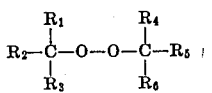

in which $R_1$, $R_2$, $R_3$, $R_4$, $R_5$, and $R_6$ are the same or different alkyl, cycloalkyl, cycloalkenyl, aryl, substituted aryl, aralkyl hydrocarbon radical. The alkyl radicals can be straight chain or branched, saturated or unsaturated. Usually these radicals contain less than about 18 to 20 carbon atoms and preferably contain less than about seven or eight carbon atoms.

If one or more of the above R groups contains an additional peroxy group attached to a tertiary carbon atom then it is possible to have di- and triperoxy compounds which are useful in this invention. These diperoxy compounds are illustrated by the following formula:

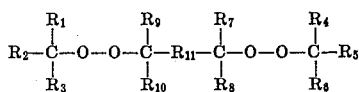

where $R_7$, $R_8$, $R_9$, $R_{10}$ and $R_{11}$ have the same meaning as that indicated for $R_1$ through $R_6$ in the above formula except $R_{11}$ is a divalent radical and the symbols of this formula which correspond to those of the first formula likewise have the same meaning as that indicated for the first formula.

Various polytertiary peroxides of the general formula shown above can be used in the practice of this invention. It is obvious that in selecting a peroxide for use in this invention the peroxide should be stable at the temperature of mixing of the elastomeric composition so that it can be mixed without decomposing and that the peroxide should decompose at a reasonable rate under the curing conditions used so that the resulting radicals can enter into the curing reactions. Representative examples of such peroxides are ditertiary-butyl peroxide; ditertiaryamyl peroxide; di(alpha, alpha-dimethylbenzyl) peroxide (also known as dicumyl peroxide); di(alpha-alpha-dimethyl-p-chlorobenzyl), peroxide; di-(alpha, alpha-dimethyl-2,4-dichlorobenzyl) peroxide; tertiarybutyl-l-methylcyclohexyl peroxide; and peroxides formed by the oxidation of terpene hydrocarbons such as turpentine, alphapinene, paramethane, and pinane.

In addition to the above ditertiary peroxides, $R_{11}$ in the formula for the diperoxy compound may also contain unsaturation wherein at least one pair of carbon atoms are joined by a double or a triple bond. Representative peroxides of the second formula type are 2,2-di-(tertiarybutylperoxy) butane; 2,5-ditertiary-butyl-peroxy-2,5-dimethylhexane; 2,5-ditertiary amyl-peroxy-2,5-dimethylhexane; 2,5-ditertiary-butyl peroxy-2,5-dimethyl-3-hexene and 2,5-ditertiary-butyl peroxy-2,5-dimethyl-3-hexyne. The preferred organic peroxides useful in this invention are dicumyl peroxide, available commercially as Di-Cup 400 and 2,5-ditertiary-butyl-peroxy-2,5-dimethylhexane, sometimes referred to herein as DBPH, available commercially as Varox.

Some of the acetylenic polyperoxy compounds desirable for curing these fluorocarbon compositions are 2,5-dimethyl-2,5-di(peroxy ethyl carbamate) hexyne-3; 2,5-dimethyl-2,5-di(t-butyl-peroxy) hexyne-3; 3,6-dimethyl-3,6-di(t-butyl peroxy) octyne-4; 1,4-tetraphenyl-1,4-(t-butylperoxy) butyne-2.

The quantity of polytertiary peroxide used in general is at least about 0.5 percent by weight, based on the polymer with the preferred amount being about 1.0 to 4.0 percent. Normally, the use of more than about 6 percent of the polytertiary peroxides results in the cured polymer having physical properties that are poorer than the optimum values obtainable at lower peroxide levels. Hence, use of amounts in excess of about 6 percent, say for instance, more than 10 percent would not generally be desirable.

However, it should be appreciated that when reinforcing fillers such as the carbon blacks or silicas are used that the percent polytertiary peroxide used preferably will be higher than when no filler is present, i.e., when curing the so-called gum stocks. The amount of additional polytertiary peroxide used and required when fillers are present is to a certain extent a function of the amount of filler used. Hence, in some cases the amount of extra peroxide used will be about 1.5 to 3 times that required to cure the gum stock per se.

Although the polyimides such as Kapton, or the pyromellitic dianhydride-phenylene diamine types became available relatively recently in film forms, other polyimide films can also be used in place of Kapton, for instance, in this invention. For example, the polyimide films prepared from the diamines and dianhydrides of Table II of C. E. Sroog, Journal of Polymer Science, part C., No. 16, pages 1191–1209 (1967) are representative of the many kinds of polyimides that can be prepared and used in the practice of this invention, with the preferred films being those that do not melt at temperatures below about 250° C. and those melting above 300° C. being preferred in the high-temperature range. Also, it should be emphasized that polyimide films such as Kapton F are available with a Teflon FEP, fluorocarbon film or coating, on either one or both sides of the Kapton film, and these are utilizable in place of a straight polyimide film such as Kapton H.

It should be appreciated that the polyimides illustrated by the foregoing formula are aromatic in nature and that aliphatic polyimides, such as those described in the Sroog article, supra, or Sroog's article in the Journal of Polymer Science, part A, Vol. 3, pages 1373 to 1390 (1965) and the Irwin et al. article in the Journal of Polymer Science, Part C., No. 19, pages 41-48 (1967) can be used, also. For instance, the polyimide films of pyromellitic dianhydride and phenylene diamine, diamino diphenyl propane and benzidine can also be used in the manner illustrated above with Kapton.

While certain representative embodiments and details have been shown for the purpose of illustrating the invention, it will be apparent to those skilled in this art that various changes and modifications may be made therein without departing from the spirit or scope of the invention.

What is claimed is:

1. A container having a body portion formed of polyamide fabric having a coating of a fluorocarbon composition thereon, said polyamide having adhered thereto a film of a polyimide, said film having on the outside surface thereof a metallic deposit.

2. The container of claim 1 wherein the film is 1 to 16 mils thick.

3. The container of claim 1 wherein the film is adhered to the coating on the outside of the fabric by a fluorocarbon cement.

4. The container of claim 1 wherein each seam between the edges of the fabric are adhered together with a fluorocarbon cement, said fluorocarbon being compounded to give a composition comprising a chain-saturated polymer containing fluorine substitution of at least half the positions available for substitution and composed substantially exclusively of carbon, hydrogen and halogen atoms, a curative selected from the class consisting of
   1. an organic peroxy compound which is relatively stable at temperatures below about 50° C. and in the presence of a basic metal oxide,
   2. an organic amine, and
   3. a Schiff's base and one to 25 parts of a basic metal oxide and one to 50 parts of red iron oxide per 100 parts of polymer and the cement being a solvent solution of said fluorocarbon composition.

5. The container of claim 1 wherein the polyamide fabric is woven and the container is resistant to the passage of fuel.

* * * * *